(12) United States Patent
Epstein

(10) Patent No.: US 11,722,725 B2
(45) Date of Patent: Aug. 8, 2023

(54) METHOD AND SYSTEM FOR SYNCHRONIZED VIEWING OF CONTENT OVER MULTIPLE REMOTE MEDIA PLAY DEVICES

(71) Applicant: ARRIS Enterprises LLC, Suwanee, GA (US)

(72) Inventor: Scott R. Epstein, Huntingdon Valley, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/245,830

(22) Filed: Apr. 30, 2021

(65) Prior Publication Data

US 2021/0344993 A1  Nov. 4, 2021

Related U.S. Application Data

(60) Provisional application No. 63/018,755, filed on May 1, 2020.

(51) Int. Cl.
*H04N 21/43* (2011.01)
*H04N 21/426* (2011.01)
(Continued)

(52) U.S. Cl.
CPC . *H04N 21/43076* (2020.08); *H04N 21/42615* (2013.01); *H04N 21/4341* (2013.01); *H04N 21/4348* (2013.01); *H04N 21/6587* (2013.01)

(58) Field of Classification Search
CPC ....... H04N 21/43076; H04N 21/42615; H04N 21/4341; H04N 21/4348; H04N 21/6587
See application file for complete search history.

(56) References Cited

U.S. PATENT DOCUMENTS

2009/0205008 A1  8/2009  Wollmershauser et al.
2011/0199262 A1*  8/2011  Karaoguz ............... G01S 19/36
                                                          342/357.64
(Continued)

FOREIGN PATENT DOCUMENTS

KR  10-2013-0008522 A  1/2013
KR  10-2016-0022307 A  2/2016
KR  10-2019-0106986 A  9/2019

OTHER PUBLICATIONS

Notification of Transmittal of the International Search Report (Forms PCT/ISA/220 and PCT/ISA/210) and the Written Opinion of the International Searching Authority (Form PCT/ISA/237) dated Aug. 20, 2021, by the International Application Division Korean Intellectual Property Office in corresponding International Application No. PCT/US2021/030056. (9 pages).

*Primary Examiner* — Kyu Chae
(74) *Attorney, Agent, or Firm* — Panitch Schwarze Belisario & Nadel LLC

(57) ABSTRACT

A synchronization control device configured to synchronize media play between at least two remote devices is disclosed. The synchronization control device includes: an input for receiving data indicating a point in a play of media content on a first remote media play device; and a synchronization controller module configured to align the point of play of media content on a first remote media play device with a point of play of the media content at a second remote media play device; and delivering commands to the first remote media play device and the second remote media display device, wherein the commands control the first remote media play device and the second remote media play device to substantially synchronize the play of the media content in the first remote media play device and the second remote media play device.

20 Claims, 6 Drawing Sheets

(51) Int. Cl.
*H04N 21/6587* (2011.01)
*H04N 21/434* (2011.01)

(56) References Cited

U.S. PATENT DOCUMENTS

| | | | |
|---|---|---|---|
| 2011/0246908 A1* | 10/2011 | Akram | H04N 21/4788 |
| | | | 715/752 |
| 2012/0311043 A1 | 12/2012 | Chen et al. | |
| 2014/0071344 A1* | 3/2014 | Francisco | H04N 21/6587 |
| | | | 348/E5.009 |
| 2014/0096169 A1 | 4/2014 | Dodson et al. | |
| 2015/0052571 A1* | 2/2015 | Stokking | H04N 21/8547 |
| | | | 725/116 |
| 2016/0142749 A1 | 5/2016 | Francis et al. | |
| 2016/0302166 A1* | 10/2016 | Dang | H04L 65/4084 |
| 2017/0064397 A1* | 3/2017 | Iyer | H04N 21/458 |
| 2017/0251235 A1 | 8/2017 | Sanders | |
| 2018/0077443 A1 | 3/2018 | Lau et al. | |
| 2019/0297591 A1* | 9/2019 | Crowe | H04N 21/43076 |
| 2021/0250195 A1* | 8/2021 | Baker | H04L 65/403 |

\* cited by examiner

METHOD AND SYSTEM FOR SYNCHRONIZED VIEWING OF CONTENT OVER MULTIPLE REMOTE MEDIA PLAY DEVICES

TECHNICAL FIELD

The present disclosure generally relates to a method and system for synchronized viewing of media content over multiple remote media play devices, and more particularly to a method and system for synchronizing play of media content in a first remote media play device and a second remote play device.

BACKGROUND

Cable service providers, which are also referred to as Multiple System Operators ("MSO"), or any communication or content distribution business that operates through a cable network, renders its services to its subscribers. The services can include, but are not limited to, different subscription plans for broadband Internet access and telephony. In order to consume these services, subscribers connect to a private network owned (or co-owned or rented) by the broadband cable operator which is implemented according to the Data Over Cable Service Interface Specification (DOCSIS) standard.

Currently, when consumers are watching media content delivered from, for example, a set-top box to a media play device, and the consumers are in two different or separate locations, there is no way to ensure that the consumers are watching synchronized content (other than, for example, live television) particularly when permitted to rewind, pause, stop, or fast forward. For instance, friends might be watching the same sports event for example, and want to experience the big plays simultaneously, particularly if communication via telephone, conference line, texting, etc.

SUMMARY

In accordance with exemplary embodiments, it would be desirable to have a method and system for synchronized viewing of media content over multiple remote media play devices, which can simulate a shared viewing experience that one would have with someone located in a same room, for example, where one could pause to discuss what just happened, or one could rewind to hear or see something that was missed.

In accordance with an aspect, a synchronization control device configured to synchronize media play between at least two remote devices is disclosed, the synchronization control device comprising: an input for receiving data indicating a point in a play of media content on a first remote media play device; and a synchronization controller configured to align the point of play of media content on a first remote media play device with a point of play of the media content at a second remote media play device; and delivering commands to the first remote media play device and the second remote media display device, wherein the commands control the first remote media play device and the second remote media play device to substantially synchronize the play of the media content in the first remote media play device and the second remote media play device.

In accordance with another aspect, a set-top box is disclosed, comprising: a demultiplexing module for separating a video component from the multimedia stream and delay data, wherein the delay data is stored on a computer readable medium on a residential gateway, and wherein the set-top box is communicatively coupled to the remote media play device; and a buffer that stores and controls the play of media content in accordance with the delay data.

In accordance with an aspect, a computer program product stored on one or more computer readable media is disclosed, the computer program product enabled for synchronizing play of the media content in a first remote media play device and a second remote media play device, the computer program product having instructions operable for: receiving data indicating a point in a play of media content on the first remote media play device; and aligning the point of play of media content on the first remote media play device with a point of play of the media content at the second remote media play device; and delivering commands to the first remote media play device and the second remote media display device, wherein the commands control the first remote media play device and the second remote media play device to substantially synchronize the play of the media content in the first remote media play device and the second remote media play device.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

System for Synchronized Viewing of Content Over Multiple Devices

Figure 1:
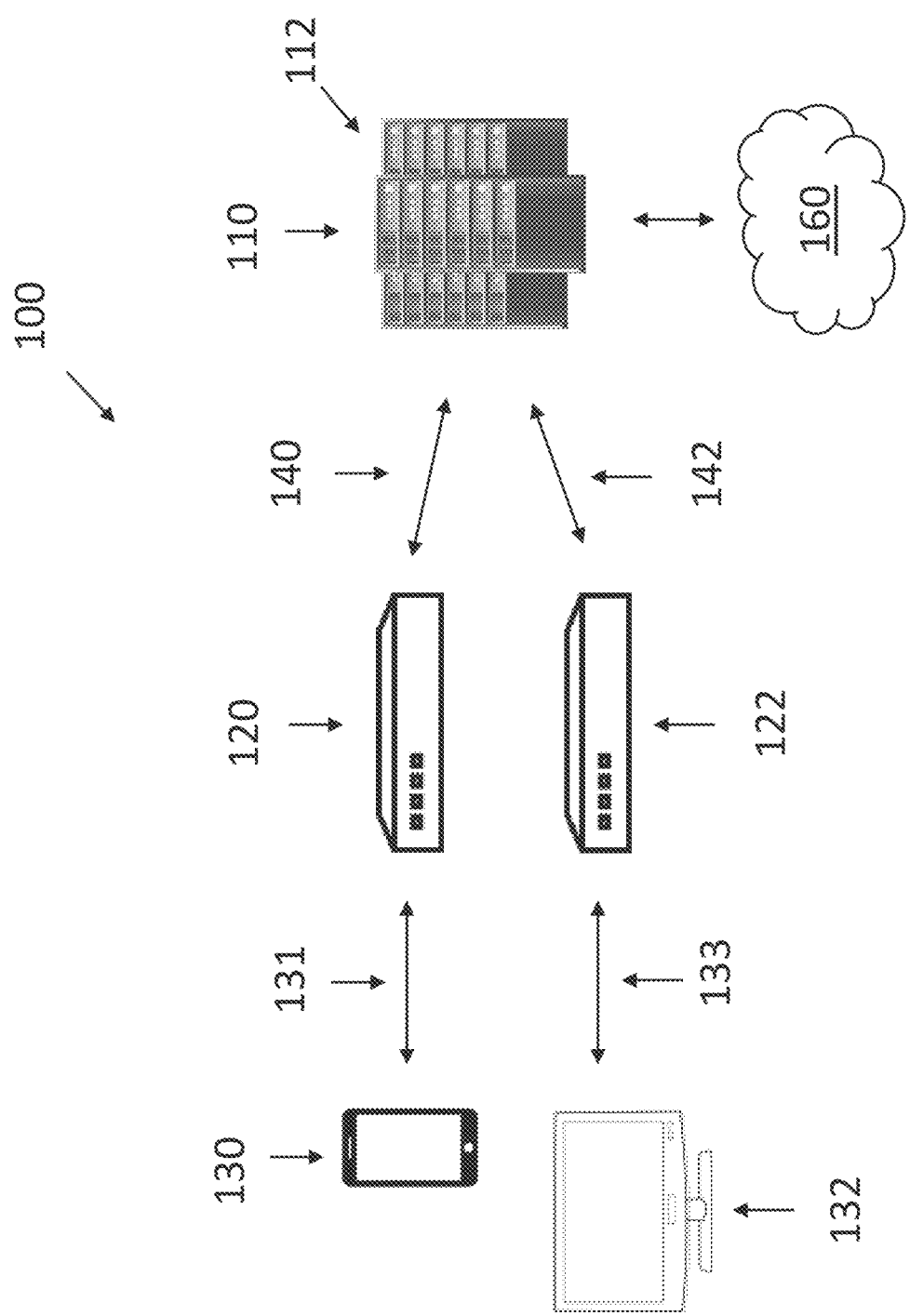
FIG. 1 is an illustration of an exemplary network environment for a system and method for synchronized viewing of content over multiple remote media play devices.

FIG. 1 is a block diagram illustrating an example network environment 100 for synchronizing viewing of content over two or more remote media play devices 130, 132. In embodiments, a cable provider (or MSO) server 110 can provide, for example, media content, for example, video and/or data services to a plurality of set-top boxes (STB) 120, 122. Each of the plurality of set-top boxes 120, 122 may communicate with one or more remote media play devices 130, 132 over a local network 131, 133 (for example, a local area network (LAN), a wireless local area network (WLAN), a personal area network (PAN), etc.) and/or wired, for example, a television 132, and may communicate with an upstream wide area network (WAN) 140, 142 to a cable provider server 110.

In accordance with an embodiment, the cable provider server 110 can provide high-bandwidth data transfer, for example, media content, cable television and broadband internet access. In accordance with an exemplary embodiment, the cable provider server 110 can include a synchronization control device 112 as described herein, and wherein the synchronization control device 112 is configured to synchronize media play between two or more remote media play devices 130, 132 via communication, for example, with a set-top box 120, 122. In addition, the cable provider server 110 can provide content, for example, media content, from one or more media-service providers 160, which is then delivered to the remote media play device 130, 132 via the set-top box 120, 122. For example, the one or more media-service providers 160 can be an application based service.

In accordance with an exemplary embodiment, the two or more remote media devices 130, 132 may be any type of computing device configured to connect via a wireless network, for example, wireless network utilizing an IEEE 802.11 specification, including a smart phone, a smart TV, a computer, a mobile device, a tablet, or any other device operable to communicate wirelessly with the set-top box 120, 122. In accordance with an alternative embodiment, the two or more remote media devices 130, 132, can be a television, for example, that is directly connected to the set-top box 120, 122. In an embodiment, the media content can be delivered to remote media play device 130, 132 via a residential gateway 170 (FIG. 5), and wherein the residential gateway 170 is communicatively coupled to the remote media play device 130, 132, and to a set-top box 120, 122.

In accordance with an exemplary embodiment, the set-top box 120, 122, may communicate with the cable provider server 110 over a wired or a wireless connection 140, 142. A wireless connection between the cable provider server 110 and the set-top box 120, 122 may be established through a protected setup sequence (for example, Wi-Fi protected setup (WPS)). The protected setup sequence may include the steps of scanning multiple wireless channels for an available access point, exchanging one or more messages between a station and access point, exchanging key messages (for example, pre-shared key (PSK)) between the station and access point, and installing a key (for example, PSK) at the station.

Computer System Architecture

Figure 2:
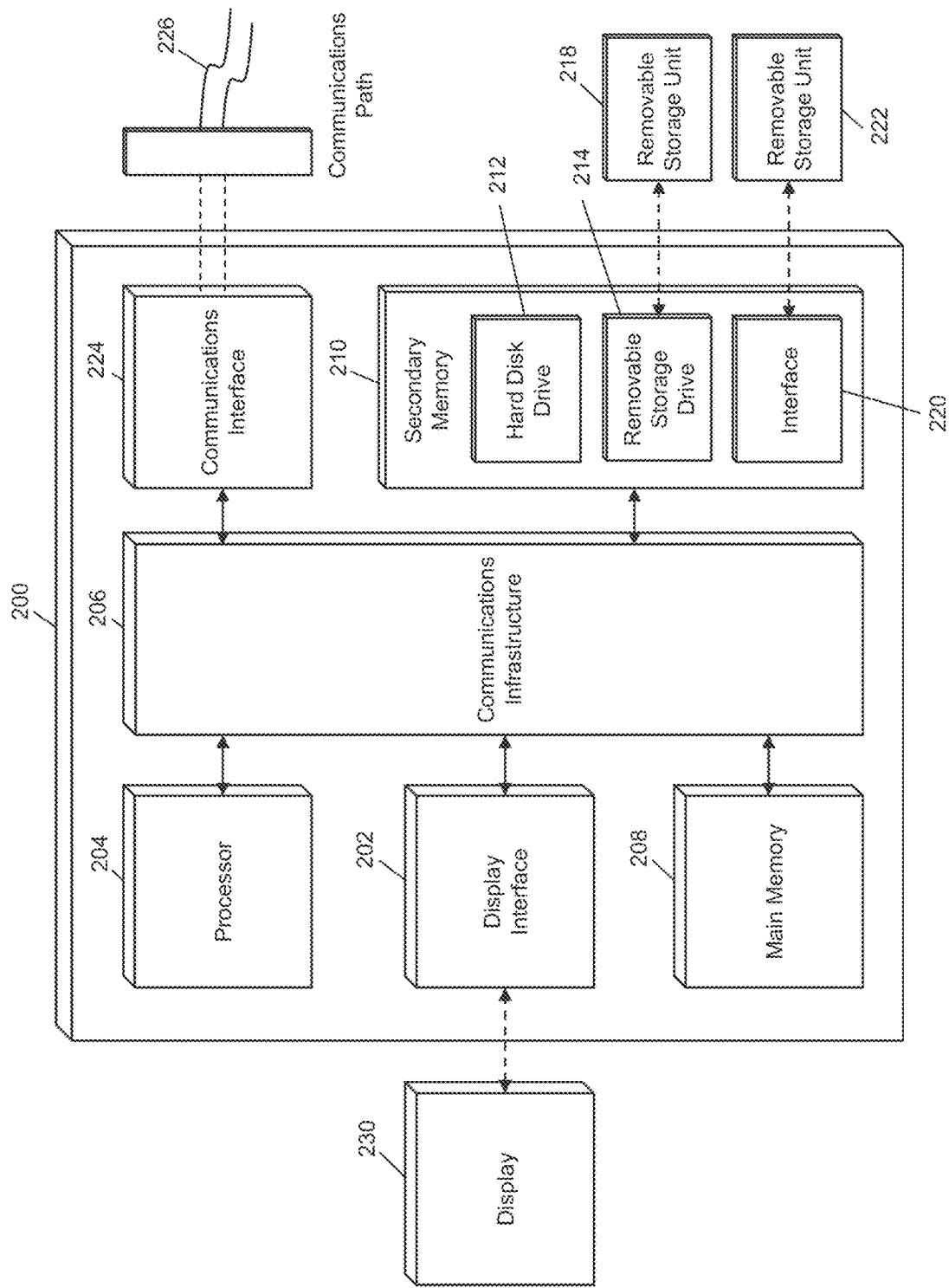
FIG. 2 is an exemplary hardware architecture for an embodiment of a communication device.

FIG. 2 illustrates a representative computer system 200 in which embodiments of the present disclosure, or portions thereof, may be implemented as computer-readable code executed on hardware. For example, the synchronization control device 112, the set-top boxes 120, 122, the remote media play devices 130, 132, and the residential gateway 170 of FIGS. 1, 3, 4, and 5 may be implemented in whole or in part by a computer system 200 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 218, a removable storage unit 222, and a hard disk installed in hard disk drive 212.

Various embodiments of the present disclosure are described in terms of this representative computer system 200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 204 may be processor device specifically configured to perform the functions discussed herein. The processor device 204 may be connected to a communications infrastructure 206, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 200 may also include a main memory 208 (e.g., random access memory, read-only memory, etc.), and may also include a secondary memory 210. The secondary memory 210 may include the hard disk drive 212 and a removable storage drive 214, such as a floppy disk drive, a magnetic tape drive, an optical disk drive, a flash memory, etc.

The removable storage drive 214 may read from and/or write to the removable storage unit 218 in a well-known manner. The removable storage unit 218 may include a removable storage media that may be read by and written to by the removable storage drive 214. For example, if the removable storage drive 214 is a floppy disk drive or universal serial bus port, the removable storage unit 218 may be a floppy disk or portable flash drive, respectively. In one embodiment, the removable storage unit 218 may be non-transitory computer readable recording media.

In some embodiments, the secondary memory 210 may include alternative means for allowing computer programs or other instructions to be loaded into the computer system 200, for example, the removable storage unit 222 and an interface 220. Examples of such means may include a program cartridge and cartridge interface (e.g., as found in video game systems), a removable memory chip (e.g., EEPROM, PROM, etc.) and associated socket, and other removable storage units 222 and interfaces 220 as will be apparent to persons having skill in the relevant art.

Data stored in the computer system 200 (e.g., in the main memory 208 and/or the secondary memory 210) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 200 may also include a communications interface 224. The communications interface 224 may be configured to allow software and data to be transferred between the computer system 200 and external devices. Exemplary communications interfaces 224 may include a modem, a network interface (e.g., an Ethernet card), a communications port, a PCMCIA slot and card, etc. Software and data transferred via the communications interface 224 may be in the form of signals, which may be electronic, electromagnetic, optical, or other signals as will be apparent to persons having skill in the relevant art. The signals may travel via a communications path 226, which may be configured to carry the signals and may be implemented using wire, cable, fiber optics, a phone line, a cellular phone link, a radio frequency link, etc.

The computer system 200 may further include a display interface 202. The display interface 202 may be configured to allow data to be transferred between the computer system 200 and external display 230. Exemplary display interfaces 202 may include high-definition multimedia interface (HDMI), digital visual interface (DVI), video graphics array (VGA), etc. The display 230 may be any suitable type of display for displaying data transmitted via the display interface 202 of the computer system 200, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 208 and secondary memory 210, which may be memory semiconductors (e.g., DRAMs, etc.). These computer program products may be means for providing software to the computer system 200. Computer programs (e.g., computer control logic) may be stored in the main memory 308 and/or the secondary memory 210. Computer programs may also be received via the communications interface 224. Such computer programs, when executed, may enable computer system 200 to implement the present methods as discussed herein. In particular, the computer programs, when executed, may enable processor device 204 to implement the methods illustrated by FIGS. 1 and 3-6, as discussed herein. Accordingly, such computer programs may represent controllers of the computer system 200. Where the present disclosure is implemented using software executed on hardware, the software may be stored in a computer program product and loaded into the computer system 200 using the removable storage drive 214, interface 220, and hard disk drive 212, or communications interface 224.

The processor device 204 may comprise one or more modules or engines configured to perform the functions of the computer system 200. Each of the modules or engines may be implemented using hardware and, in some instances, may also utilize software executed on hardware, such as corresponding to program code and/or programs stored in the main memory 208 or secondary memory 210. In such instances, program code may be compiled by the processor device 204 (e.g., by a compiling module or engine) prior to execution by the hardware of the computer system 200. For example, the program code may be source code written in a programming language that is translated into a lower level language, such as assembly language or machine code, for execution by the processor device 204 and/or any additional hardware components of the computer system 200. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 200 to perform the functions disclosed herein. It will be apparent to persons having skill in the relevant art that such processes result in the computer system 200 being a specially configured computer system 200 uniquely programmed to perform the functions discussed above.

Techniques consistent with the present disclosure provide, among other features, systems and methods for synchronizing media play between at least two remote media play devices 130, 132. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

Set-Top Box

Figure 3:
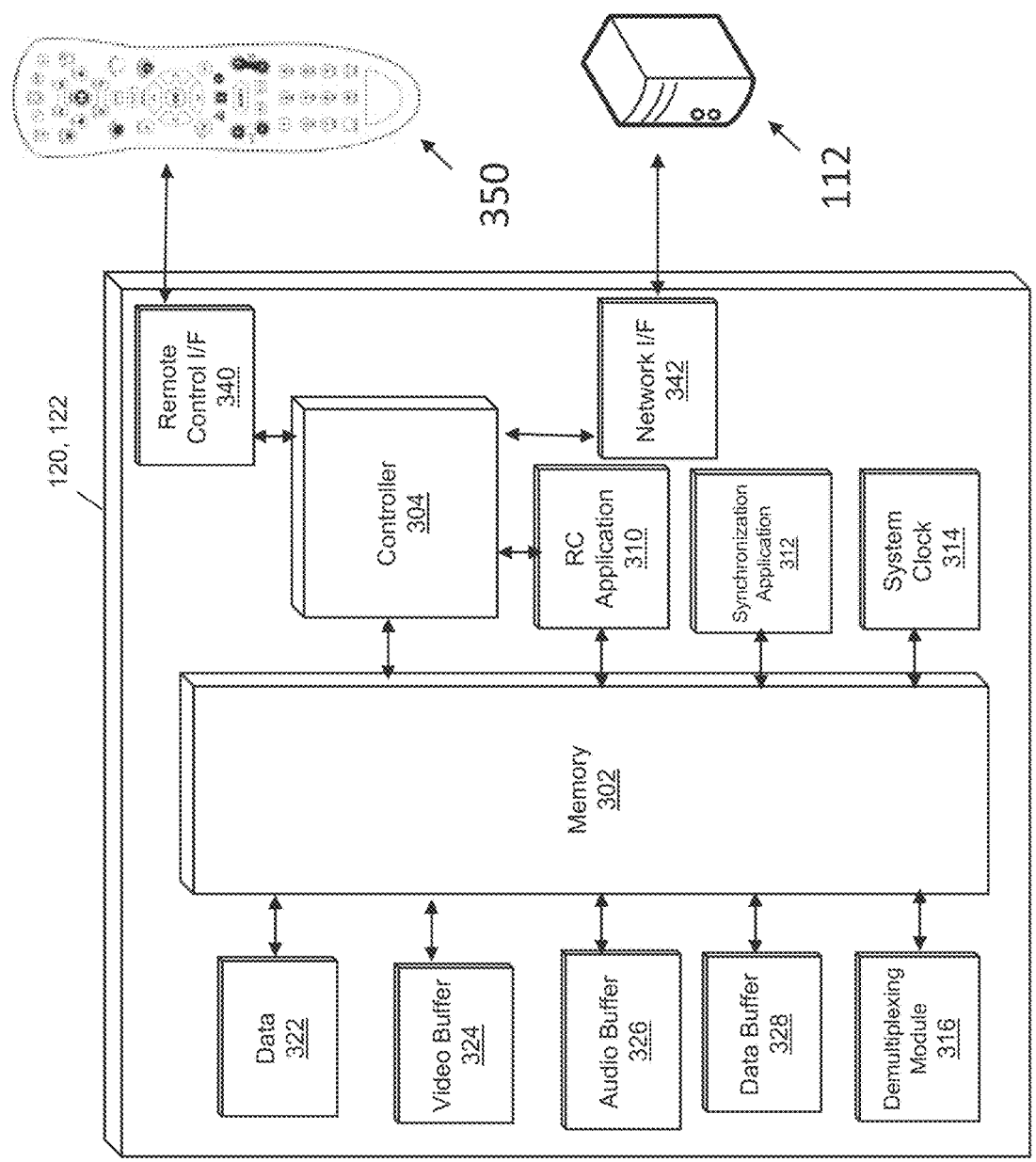
FIG. 3 illustrates a representative set-top box for synchronizing media play between at least two remote media play devices.

FIG. 3 illustrates a representative set-top box 120, 122, for synchronizing media play between at least two remote devices 130, 132. In accordance with an embodiment, the memory 302 of the set-top box 120, 122 includes programs or execution modules, for example, a remote control (RC) application 310, a synchronization application 312, a system clock 314, and demultiplexing module 316. The demultiplexing module 316 can be configured to separate a video component from the multimedia stream and delay data as disclosed herein. The set-top box 120, 122 can also include data 322 and one or more buffers 324, 326, 328, for example, a video buffer 324, an audio buffer 326, and a data buffer 328.

In accordance with an aspect, the remote control application 310 includes computer executable code that supports the set-top box's 120, 122 remote control functionality. For example, when a user depresses a button on remote control device 350, for example, to pause the playback of the content being shown on the remote media play device 130, 132, the remote control application 310 includes code to stop the play signal being generated by set-top box 120, 122 and send a corresponding signal to the synchronization control device 112 as disclosed herein. In some embodiments, the remote control application 310 can be controlled by the controller 304 in response to a signal from the network interface (I/F) 342 via the synchronization control device 112.

Although a wireless remote control device 350 can be employed to convey user commands to set-top box 120, 122, the user commands may be conveyed to set-top box 120, 122 in other ways. For example, set-top box 120, 122 may include a display panel having function buttons that are associated with various commands, some of which may coincide with commands associated with function buttons on remote control device 350. Although remote control device 350 is described herein as being an RF or IR remote control device, other embodiments may use other media and/or protocols to convey commands to set-top box 120, 122. For example, remote control commands may be conveyed to set-top box 120, 122 via USB, WiFi (IEEE 802.11-family protocols), and/or Bluetooth techniques, all of which are well known in the field of network communications from other wireless devices such as smart phones, tablets, consoles, or nearly any other wired or wireless computing device that is specifically programmed to carry out these functions, etc.

The remote control I/F (interface) 340 may be operable to parse or otherwise extract the remote control command that is included in the signal. The remote control command may then be made available to the controller 304 and/or the remote control application 310. In this manner, the remote control application 310 may receive an indication of the remote control command from the remote control I/F 340.

As shown in FIG. 3, the set-top box 120, 122 can include a system clock 314, which is configured to access a server provided time or another type of global time accessible by multiple set-top boxes 120, 122 that are synchronized in accordance with disclosed embodiments. In addition, the system clock 314 may be responsible for providing time stamps for use in a table stored as part of the data 322. The data 322 may include a plurality of entries corresponding to a sequence of frames presented by the set-top box 120, 122. In some embodiments, the data 322 may include timestamps created with the aid of the system clock 314.

In accordance with an aspect, the video buffer 324 can temporarily store (i.e., buffers) a video portion of an incoming multimedia stream that corresponds to a multimedia program. Similarly, an audio buffer 326 stores an audio portion of the incoming multimedia stream and a data buffer 328 stores any data that may be associated with the multimedia stream such as EPG data.

In accordance with an exemplary embodiment, a synchronization application 312 can be responsible for receiving commands from the synchronization control device 112 of the cable provider server 110 to substantially synchronize the play of the media content in the first remote media play device 130 or the second remote play device 132 as disclosed herein. In some cases, a user may provide input via the remote control device 350 over the remote control interface 340 to either delay or advance the video or audio portion of the presentation by the set-top box 120, 122, which generates a signal that is sent to the synchronization control device 112 indicating a point in a playing of the media content on the first remote media play device 130 or the second remote media play device 132.

Synchronization Control Device

Figure 4:
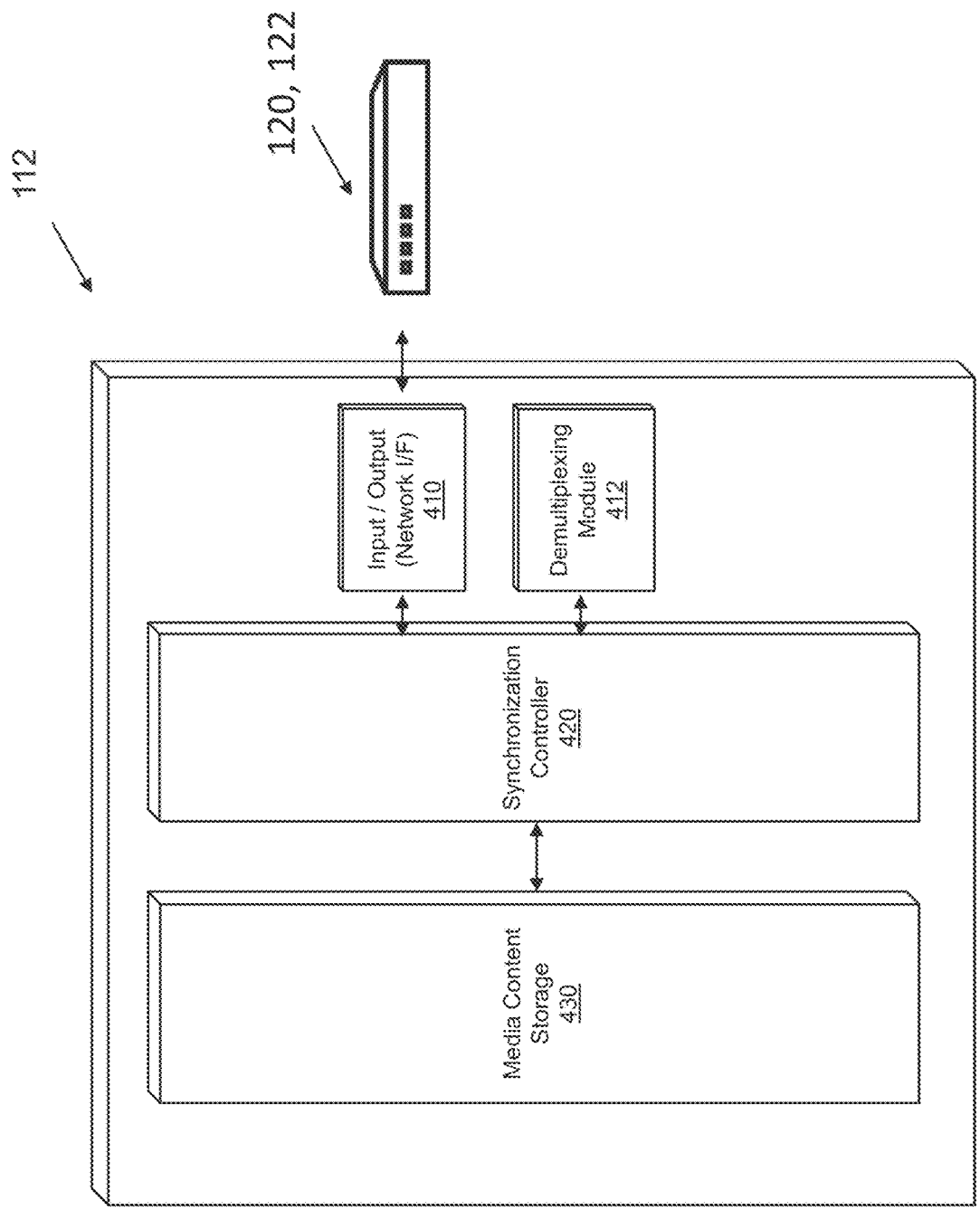
FIG. 4 illustrates a representative synchronization controller for synchronizing media play between at least two remote media play devices.

FIG. 4 illustrates a representative synchronization control device 112 associated with the cable provider server 110 or as a stand-alone service in the cloud for synchronizing media play between at least two remote media play devices 130, 132. As disclosed herein, the synchronization control device 112 can be configured to synchronize media play between at least two remote devices 130, 132, and can include an input 410 (i.e., network interface (I/F) for receiving data indicating a point in a play of media content on a first remote media play device 130, and a synchronization controller 420 configured to align the point of play of media content on the first remote media play device 130 with a point of play of the media content at a second remote media play device 132. In addition, the synchronization control device 112 can be configured to deliver commands to the first remote media play device 130 and the second remote media display device 132, wherein the commands control the first remote media play device 130 and the second remote media play device 132 to substantially synchronize the play of the media content in the first remote media play device 130 and the second remote media play device 132.

In accordance with an embodiment, session management messages sent by the set-top boxes 120, 122 can include, for example, a device's most recent I-frame sequence number when using the MPEG standard. MPEG headers have temporal sequence numbers and I-frames in an MPEG are a complete image, not needing other frames for display. Commands, for example, from the synchronization control device can include the initiator's I-frame sequence number. In instances where precise synchronization is needed, for example when pausing and resuming, all synchronized devices would move to the sending device's I-frame. In accordance with an embodiment, the session management commands can be sent to the cable provider server 110, for example, for content being delivered or streamed by the cable provider server 110 to the first remote media play device 130 and the second remote media play device 132 via the set-top box 120, 122.

In another embodiment, the synchronization controller can further include a media content storage 430, and an output 410 for sending a media content to the first remote media play device 130 and the second remote media play device 132. In accordance with an embodiment, the synchronization control device 112 sends command signals to at least one of the first remote media play device 130 and the second remote media play device 132 that includes data related to delay in play of the media content proportional to latency in the delivery path from the media content storage 430 to at least one of the first remote media play device 130 and the second remote media play device 132.

Figure 5:
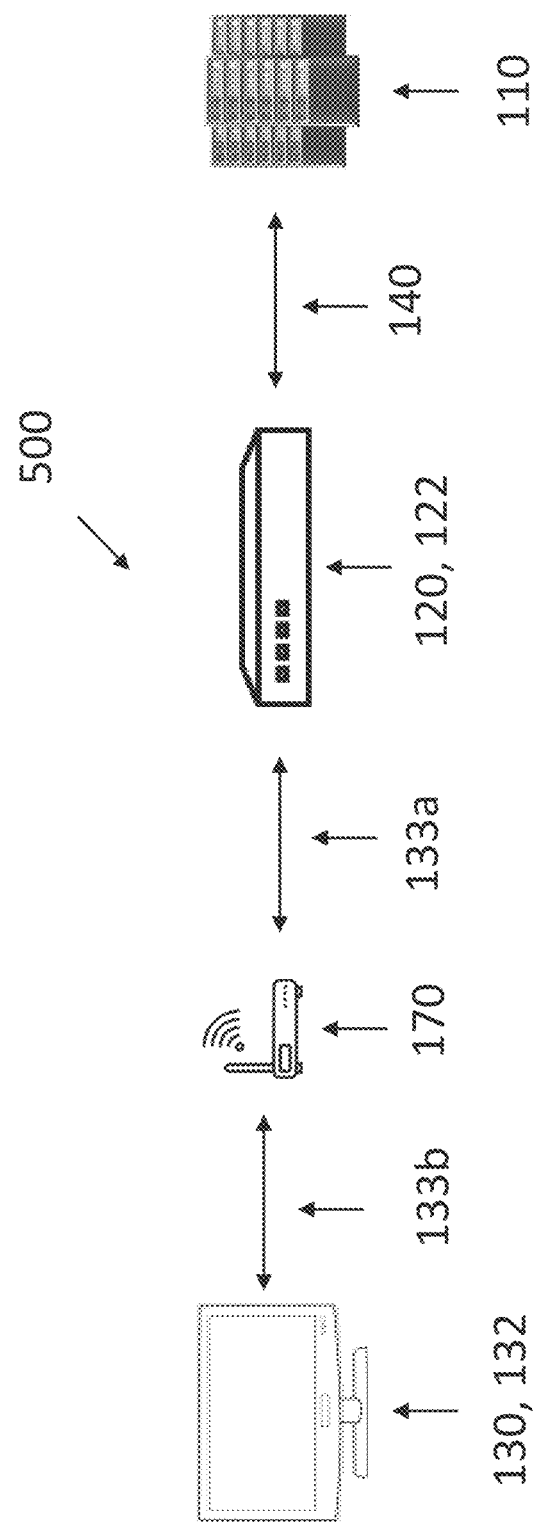
FIG. 5 is an illustration of an exemplary network environment for synchronized viewing of content over a multiple devices with a residential gateway.

In accordance with an embodiment, the data (i.e., delay data) related to the delay in play of the medic content proportional to latency in the delivery path from the media content storage 430 to at least one of the first remote media play device 130 and the second remote media play device 132 can be stored on a computer readable medium on a residential gateway 170 (FIG. 5). In an embodiment, the residential gateway 170 is communicatively coupled to the remote media play device 130, 132 and to a set-top box 120, 122.

In accordance with an exemplary embodiment, the system and method to synchronize media play between at least two remote devices can include a registration process that users can executed via the remote control device 350 and/or other methods with the cable provider server 110. The registration process can include assigning a user identifier to each new user. In addition, a device identifier can also be assigned to each of the set-top boxes 120, 122, and/or each of the remote media play devices 130, 132 during the registration process.

The registration process can include limitations as to whom each user wishes to be able to synchronize viewing, and upon identifying those users that wish to synchronize viewing, a synchronization viewing request can be sent, for example, by the synchronization control device 112 to the set-top box 120, 122.

In accordance with an exemplary embodiment, a synchronization session can be initiated by a user, for example, via a remote control device 350 through the set-top box 120, 122, or alternatively, for example, on a display panel on the set-top box 120, 122 by selecting one or more users to join the synchronization session. The synchronization initiation requests can be sent to the synchronization control device 112, which can send session initiation requests to the selected user's set-top boxes 120, 122. In accordance with an exemplary embodiment, a display on the remote media play devices 130, 132 can display a message giving a user an opportunity to accept or deny the synchronization initiation request.

In accordance with an embodiment, the synchronization control device 112 can send commands that affect viewing, for example, pause, play, fast forward, and rewind of the media content. In accordance with an embodiment, the fast forwarding and rewinding of media content does not require close synchronization. However, the playback of the media content should be substantially synchronized on the first remote play device 130 and the second remote play device 132. In addition, each of the first remote play device 130 and the second remote play device 132 can end the synchronization session, for example, by inputting an end command onto the remote play device 130, 132, via the set-top box 120, 122, and/or a remote control device 350. In addition, remote play devices 130, 132 and/or set-top boxes 120, 122 can include a "do not disturb" feature, such that, remote play devices 130, 132 do not receive synchronization session requests if sent by another user.

System with Residential Gateway

FIG. 5 is an illustration of an exemplary network environment 500 for synchronized viewing of content over one or even multiple remote (relative to another display device) devices with a residential gateway 170 or gateways 170 at different locations such as different residences, businesses, etc. As shown in FIG. 5, the system 500 can include a residential gateway 170, which is communicatively coupled to the media play device 130, 132 and to the set-top box 120, 122. The residential gateway 170 can be, for example, a router which provide network access between the remote media play devices 130, 132, and the set-top box 120, 122 and delivers media content as disclosed herein.

Synchronizing Viewing of Content Over Multiple Play Devices

Figure 6:
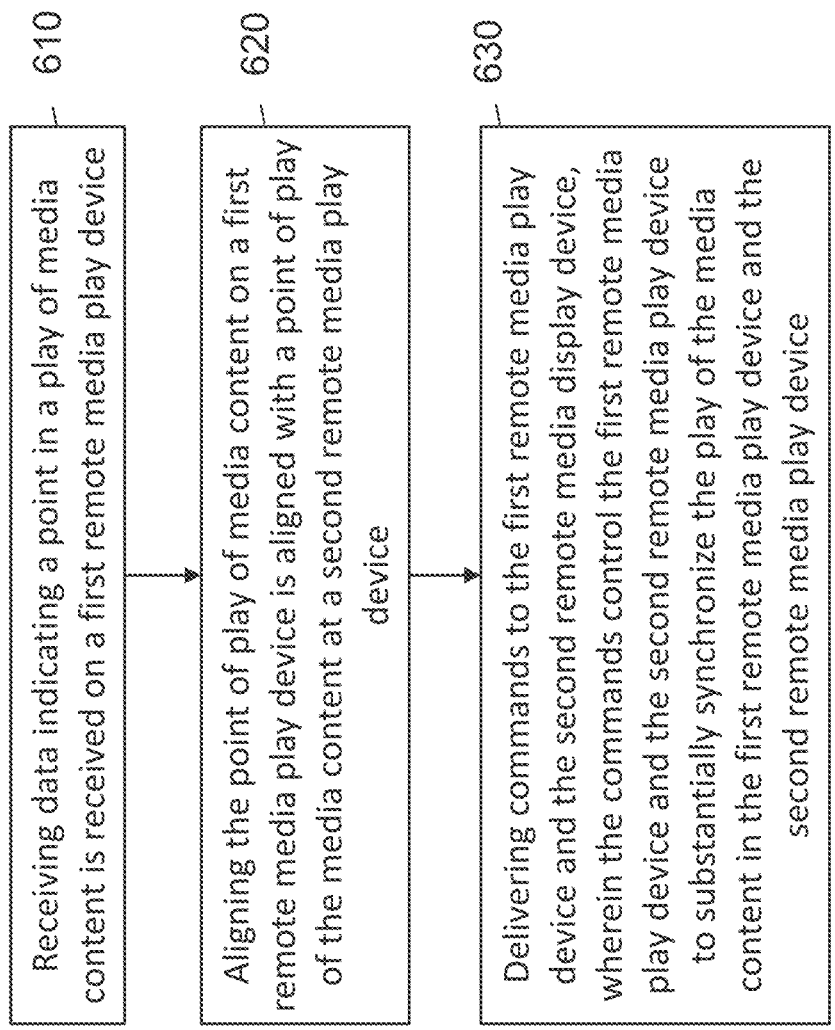
FIG. 6 is a flow chart of a method for synchronized viewing of content over multiple remote media play devices in accordance with an embodiment.

FIG. 6 is a flow chart 600 of a method of synchronizing play of media content in a first remote media play device 130 and/or a second remote media play device 132. As shown in FIG. 6, in step 610, data indicating a point in a play of media content (e.g., frame number, I-frame, time stamp, embedded tic mark, etc.) is received on a first remote media play device 130. In accordance with an embodiment, the set-top boxes 120, 122, would receive the synchronization messages and corresponding data indicating the point in the play of the media content. Alternatively, for example, in the case of television attached to the set-top box 120, 122, the set-top box 120, 122 would perform all of the synchronization of the synchronization messages and corresponding data. In step 620, the point of play of media content on a first remote media play device 130 is aligned with a point of play of the media content at a second remote media play device 132. In step 630, commands are delivered to the first remote media play device 130 and the second remote media display device 132, wherein the commands control the first remote media play device 130 and the second remote media play device 132 to substantially synchronize the play of the media content in the first remote media play device 130 and the second remote media play device 132.

In accordance with an embodiment, the reference input can be received over a wide area network. In addition, the components of a multimedia stream can be stored in one or more buffers on the set-top box 120, 122 before the media content is delivered to the first remote media play device 130 and/or the second remote media play device 132.

In accordance with an embodiment, the storing components of a media stream in one or more buffers includes storing an audio portion of the media stream to an audio buffer, and wherein, for example, the computer program product further has instructions operable for comparing delay data to the play of the media content in the first remote media play device and the second remote media play device within the audio buffer, and adjusting a play point of the media stream based on the comparing. The storing of a media stream in one or more buffers can include storing a video portion of a media stream to a video buffer, and wherein adjusting the play of the media content in the first remote media play device and the second remote media play device includes: adjusting an audio play point of the media stream; and adjusting a video play point of the media stream.

Techniques consistent with the present disclosure provide, among other features, systems and methods for synchronized viewing of content over multiple devices. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A synchronization control device configured to synchronize media play between at least two remote devices, the synchronization control device comprising:
 a synchronization controller configured to initiate a synchronization session for synchronized play of media content from a cable provider between a first remote play device and a second remote play device, the first remote play device connected to a first set-top-box (STB) located in a first location and the second remote play device connected to a second STB located in a second location, the second location being separate from the first location;
 an input for receiving data indicating a point in a play of the media content on the first remote media play device, wherein the data includes a most recent I-frame of the media content;
 the synchronization controller configured to align the point of play of the media content on the first remote media play device with a point of play of the media content at the second remote media play device based on the I-frame received from the first remote media play device; and delivering commands to the first remote media play device and the second remote media play device, wherein the commands control the first remote media play device and the second remote media play device to substantially synchronize the play of the media content based on the I-frame received from the first remote media play device in the first remote media play device and the second remote media play device.

2. The synchronization control device of claim 1, further comprising:
a media content storage; and
an output for sending the media content to the first remote media play device and the second remote media play device.

3. The synchronization control device of claim 1, wherein the synchronization controller sends command signals to at least one of the first remote media play device and the second remote media play device that includes data related to delay in play of the media content proportional to latency in the delivery path from the media content storage to at least one of the first remote media play device and the second remote media play device.

4. The synchronization control device of claim 3, wherein the delay data is stored on a computer readable medium on a residential gateway, and wherein the residential gateway is communicatively coupled to at least one of the first remote media play device and the second remote media play device and to at least one of the first set-top box and the second set-top box.

5. The synchronization control device of claim 4, wherein at least one of the first set top box and the second set-top box further comprising:
a demultiplexing module for separating a video component from the multimedia stream and delay data.

6. The synchronization control device of claim 1, wherein the data includes a synchronization request and at least one user identifier, the user identifier associated with a user of the second remote media play device;
wherein the commands include a session initiation request transmitted to the second remote media play device; and
the input receiving an acceptance of the session initiation request from the second remote media play device.

7. The computer program product of claim 1, wherein the data includes a synchronization request and at least one user identifier, the user identifier associated with a user of the second remote media play device;
wherein the commands include a session initiation request transmitted to the second remote media play device; and
receiving an acceptance of the session initiation request from the second remote media play device.

8. The synchronization control device of claim 1, wherein the initiating the synchronization session between the first remote play device and the second remote play device includes:
the synchronization controller receiving a synchronization session request from the first remote media play device, the synchronization session request including a selection of the second remote play device;
the controller device transmitting a synchronization session initiation request to the second remote media play device; and
the synchronization controller receiving a response to the synchronization session initiation request from the second remote media play device.

9. The set-top box of claim 8, wherein the selection of the second remote media play device includes a device identifier associated with the second remote media play device; and
wherein the transmitting the synchronization session initiation request to the second remote media play device includes:
the synchronization controller identifying the second remote media play device based on the device identifier.

10. The set-top box of claim 8, wherein the selection of the second remote media play device includes a user identifier; and
wherein the transmitting the synchronization session initiation request to the second remote media play device includes:
the synchronization controller identifying the second remote media play device based on the user identifier.

11. A set-top box, comprising:
a network interface transmitting an initiation request to establish synchronization session for synchronized play of media content from a cable provider between a first remote play device and a second remote play device to a synchronization control device, the first remote play device connected to a first set-top-box (STB) located in a first location and the second remote play device connected to a second STB located in a second location, the second location being separate from the first location;
the network interface transmitting data indicating a point in a play of the media content on the first remote media play device to the synchronization control device, wherein the data includes a most recent I-frame of the media content;
the network interface receiving commands from the synchronization control device, the commands to synchronize the play of the media content on the first remote play device with play of the media content on the second remote play device based on the I-frame;
a demultiplexing module for separating a video component from the multimedia stream and delay data, wherein the delay data is stored on a computer readable medium on a residential gateway, and wherein at least one of the first set-top box and the second set-top box is communicatively coupled to at least one the first remote media play device and the second remote media play device; and
a buffer that stores and controls the play of media content in accordance with the delay data.

12. The set-top box of claim 11 further comprising:
a system clock for access by the synchronization control device to synchronize the play of the media content in the first remote media play device and the second remote media play device.

13. The set-top box of claim 11, wherein the initiating the synchronization session between the first remote media play device and the second remote media play device includes:
transmitting a synchronization session request to the synchronization control device, the synchronization session request including a selection of the second remote play device.

14. The set-top box of claim 11, wherein the selection of the second remote media play device includes a device identifier associated with the second remote media play device or a user identifier.

15. A computer program product for synchronizing media play between at least two remote devices, the computer program product comprising:
a non-transitory computer-readable storage medium having program instructions embodied therewith, the program instructions executable by a computer to cause the computer to perform a method, comprising:
initiating a synchronization session for synchronized play of media content from a cable provider between a first remote play device and a second remote play device, the first remote play device connected to a first set-top-box (STB) located in a first location and the second remote play device connected to a second STB located in a second location, the second location being separate from the first location;
receiving data indicating a point in a play of media content on the first remote media play device, wherein the data includes a most recent I-frame of the media content; and
aligning the point of play of the media content on the first remote media play device with a point of play of the media content at the second remote media play device based on the I-frame received from the first remote media play device; and
delivering commands to the first remote media play device and the second remote media play device, wherein the commands control the first remote media play device and the second remote media play device to substantially synchronize the play of the media content based on the I-frame received from the first remote media play device in the first remote media play device and the second remote media play device.

16. The computer program product of claim 15, wherein the data indicating a point in a play of media content is received over a wide area network.

17. The computer program product of claim 16, further having instructions operable for:
storing components of a multimedia stream in one or more buffers.

18. The computer program product of claim 17, wherein storing components of a media stream in one or more buffers includes storing an audio portion of the media stream to an audio buffer, and wherein the computer program product further has instructions operable for:
comparing delay data to the play of the media content in the first remote media play device and the second remote media play device within the audio buffer; and
adjusting a play point of the media stream based on the comparing.

19. The computer program product of claim 18, wherein storing a media stream in one or more buffers includes storing a video portion of a media stream to a video buffer, wherein adjusting the play of the media content in the first remote media play device and the second remote media play device includes:
adjusting an audio play point of the media stream; and
adjusting a video play point of the media stream.

20. The computer program product of claim 15, wherein the initiating the synchronization session between the first remote media play device and the second remote media play device includes:
receiving a synchronization session request from the first remote media play device, the synchronization session request including a selection of the second remote media play device;
transmitting a synchronization session initiation request to the second remote media play device;
receiving a response to the synchronization session initiation request from the second remote media play device.

* * * * *